(12) United States Patent
Lobo et al.

(10) Patent No.: US 10,380,855 B2
(45) Date of Patent: Aug. 13, 2019

(54) SYSTEMS AND METHODS FOR PREDICTING AND IDENTIFYING RETAIL SHRINKAGE ACTIVITY

(71) Applicant: Walmart Apollo, LLC, Bentonville, AR (US)

(72) Inventors: Charles Lobo, Cave Springs, AR (US); Jinzhi Zhang, Bentonville, AR (US); Trisha Moore, Springdale, AR (US); Aman Tyagi, Pittsburgh, PA (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 16/040,066

(22) Filed: Jul. 19, 2018

(65) Prior Publication Data

US 2019/0027003 A1 Jan. 24, 2019

Related U.S. Application Data

(60) Provisional application No. 62/534,304, filed on Jul. 19, 2017.

(51) Int. Cl.
*G08B 13/196* (2006.01)
*G06N 20/00* (2019.01)

(52) U.S. Cl.
CPC ....... *G08B 13/19613* (2013.01); *G06N 20/00* (2019.01); *G08B 13/19645* (2013.01)

(58) Field of Classification Search
CPC ........ G08B 13/19613; G08B 13/19645; G06N 20/00
See application file for complete search history.

(56) References Cited

U.S. PATENT DOCUMENTS 6,189,789 B1 2/2001 Levine et al.
7,389,886 B2 6/2008 Hardy et al.
(Continued)

FOREIGN PATENT DOCUMENTS

JP 2008 027286 A 2/2008
JP 2008 203974 A 9/2008
(Continued)

OTHER PUBLICATIONS

Cognizant, "Strategies to Mitigate Shrink in a Boundary-less Retail World"; Cognizant 20-20 Insights; Jul. 2014; 8 pages.
(Continued)

*Primary Examiner* — Munear T Akki (57) ABSTRACT

A retail shrinkage activity prediction and identification system that includes: a sensor control system, a first shrinkage database, a second shrinkage database, an analytics engine, and a machine learning engine. The sensor control system is communicatively coupled with a plurality of sensors arranged in a retail environment. The sensor control system is configured to control a setting of each of the plurality of sensors. The first shrinkage database includes retail shrinkage data for at least the retail environment. The retail shrinkage data includes at least one item at high risk for shrinkage or at least one time at high risk for shrinkage activity. The second shrinkage database includes external data related to shrinkage in a geographic area of the retail environment. The analytics engine is communicatively coupled with the first shrinkage database, the second shrinkage database, and the sensor control system.

18 Claims, 5 Drawing Sheets

(56) References Cited

U.S. PATENT DOCUMENTS

| | | |
|---|---|---|
| 7,780,081 B1 | 8/2010 | Liang |
| 7,908,237 B2 | 3/2011 | Angell et al. |
| 8,587,662 B1 | 11/2013 | Moll et al. |
| 9,135,499 B2 * | 9/2015 | Bergman ............ G06K 9/00228 |
| 9,230,250 B1 | 1/2016 | Parker et al. |
| 9,471,866 B2 | 10/2016 | Patterson et al. |
| 2003/0107650 A1 * | 6/2003 | Colmenarez ..... G08B 13/19602 348/150 |
| 2003/0216969 A1 | 11/2003 | Bauer et al. |
| 2004/0111454 A1 * | 6/2004 | Sorensen ............... G06Q 30/02 708/200 |
| 2006/0206246 A1 | 9/2006 | Walker |
| 2007/0182818 A1 * | 8/2007 | Buehler ........... G08B 13/19602 348/143 |
| 2007/0282665 A1 | 12/2007 | Buehler et al. |
| 2009/0006286 A1 | 1/2009 | Angell et al. |
| 2010/0145899 A1 | 6/2010 | Buehler |
| 2011/0270618 A1 | 11/2011 | Banerjee et al. |
| 2011/0316697 A1 | 12/2011 | Krahnstoever et al. |
| 2012/0095805 A1 | 4/2012 | Ghosh et al. |
| 2013/0226655 A1 * | 8/2013 | Shaw .................. G06F 17/5009 705/7.29 |
| 2014/0095281 A1 | 4/2014 | Weiss et al. |
| 2014/0365334 A1 | 12/2014 | Hurewitz |
| 2015/0029339 A1 | 1/2015 | Kobres et al. |
| 2015/0088652 A1 | 3/2015 | Finley et al. |
| 2015/0095189 A1 | 4/2015 | Dharssi et al. |
| 2015/0127496 A1 | 5/2015 | Marathe et al. |
| 2015/0193794 A1 | 7/2015 | Douglas et al. |
| 2015/0242899 A1 | 8/2015 | Farhi |
| 2017/0162023 A1 | 6/2017 | Hunter et al. |
| 2017/0256149 A1 * | 9/2017 | Carey .............. G08B 13/19613 |
| 2017/0323359 A1 | 11/2017 | Dey et al. |
| 2017/0323376 A1 * | 11/2017 | Glaser ................ G06Q 30/0643 |
| 2018/0253597 A1 * | 9/2018 | Kozakaya ............ G08B 13/196 |

FOREIGN PATENT DOCUMENTS

| | | |
|---|---|---|
| WO | WO 00/73971 A1 | 12/2000 |
| WO | WO 03/077569 A1 | 9/2003 |
| WO | WO 2015/103020 A1 | 7/2015 |

OTHER PUBLICATIONS

Application and Filing Receipt for U.S. Appl. No. 15/583,264, filed May 1, 2017, Inventor(s): Dey et al.

Application and Filing Receipt for U.S. Appl. No. 15/972,743, filed May 5, 2018, Inventor(s): Sargent et al.

International Search Report and Written Opinion, for PCT Application No. PCT/US2017/030389, dated Jul. 19, 2017, 10 pages.

International Search Report and Written Opinion for corresponding PCT Application No. PCT/US2018/042896 dated Oct. 15, 2018; 8 pages.

* cited by examiner

SYSTEMS AND METHODS FOR PREDICTING AND IDENTIFYING RETAIL SHRINKAGE ACTIVITY

RELATED APPLICATION

The present application claims the benefit of U.S. Provisional Application No. 62/534,304 filed Jul. 19, 2017, which is hereby incorporated herein in its entirety by reference.

TECHNICAL FIELD

Embodiments relate generally to theft prevention and more particularly to systems and methods for predicting and identifying retail theft or "shrinkage" activity using machine learning techniques to actively control sensor systems.

BACKGROUND

Theft, or "shrinkage," is an ongoing problem for retailers. Because it can affect retailer profitability and has the potential to drive up prices experienced by all consumers, many shrinkage deterrent techniques are used to attempt to prevent it. These conventional techniques include installing cameras in stores, affixing security tags to individual products, and employing asset protection personnel in stores. While these and other techniques may deter some shrinkage activity, they are largely reactive rather than proactive. Moreover, they come with their own costs that must be absorbed by the retailer.

Accordingly, the ability to deter shrinkage from stores in a proactive way would be extremely useful to retailers while also improving retail customer experience. Therefore, new effective systems and methods for predicting and identifying retail shrinkage activity are needed.

SUMMARY

In an embodiment, a retail shrinkage activity prediction and identification system includes: a sensor control system, a first shrinkage database, a second shrinkage database, an analytics engine, and a machine learning engine. The sensor control system is communicatively coupled with a plurality of sensors arranged in a retail environment. The sensor control system is configured to control a setting of each of the plurality of sensors. The first shrinkage database includes retail shrinkage data for at least the retail environment. The retail shrinkage data includes at least one item at high risk for shrinkage or at least one time at high risk for shrinkage activity. The second shrinkage database includes external data related to shrinkage in a geographic area of the retail environment.

The analytics engine is communicatively coupled with: the first shrinkage database to access the retail shrinkage data, the second shrinkage database to access the external data, and the sensor control system to receive real-time sensor data from the plurality of sensors. The analytics engine is configured to compare the real-time sensor data with the external data to identify a high shrinkage risk situation. If a high shrinkage risk situation is identified, the analytics engine will: issue an alert, cause the sensor control system to alter the setting of at least one of the plurality of sensors, and update at least one of the first shrinkage database or the second shrinkage database. The machine learning engine is communicatively coupled with the first shrinkage database, the second shrinkage database, and the analytics engine to use the retail shrinkage data, the external data, and the issuance of an alert to conduct predictive modeling and cause the analytics engine to issue an alert if the predictive modeling determines that a high shrinkage risk situation is likely to occur.

In some embodiments, if a medium shrinkage risk situation is identified, the analytics engine will classify it as such and update at least one of the first shrinkage database or the second shrinkage database. In some embodiments, if an existing item in one of the first shrinkage database or the second shrinkage database that was previously identified as high risk or medium risk is identified as low risk, it will be reclassified as low risk and updated in the first shrinkage database and the second shrinkage database.

In an embodiment, a method of predicting or identifying retail shrinkage activity includes: accessing retail shrinkage data comprising at least one item at high risk for shrinkage or at least one time at high risk for shrinkage activity in a retail environment; accessing external data related to shrinkage in a geographic area of the retail environment; receiving real-time sensor data from a plurality of sensors arranged in the retail environment; comparing the real-time sensor data with the external data to identify a high shrinkage risk situation and if a high shrinkage risk situation is identified, issuing an alert, causing a sensor control system to alter a setting of at least one of the plurality of sensors, and updating at least one of the retail shrinkage data or the external data; conducting predictive modeling using the retail shrinkage data, the external data, and the issuance of an alert; and issuing an alert if the predictive modeling determines that a high shrinkage risk situation is likely to occur.

The above summary is not intended to describe each illustrated embodiment or every implementation of the subject matter hereof. The figures and detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION

Embodiments relate to systems and methods for prediction and identification of retail shrinkage activity. Prediction and identification of factors presenting high shrink risk enables surveillance resources and monitoring to be beneficially allocated to mitigate these risks. Some embodiments can utilize a machine learning engine to identify items that are susceptible to shrinkage and the times of day they are likely to be stolen. Certain embodiments can identify items that are more susceptible to shrinkage by shoplifters. Embodiments can use information from past shoplifting incidents to identify high risk items. Embodiments can receive information from external or public data systems regarding high risk items in the past. Embodiments can include an in-store shrink analysis system. Embodiments can provide reports, including heat maps, to store managers and associates.

Some embodiments can turn cameras toward more susceptible items or areas at certain times. Some embodiments can update an internal shrink database to better track and proactively identify high risk items and areas of a store. Some embodiments can also utilize machine learning to identify an individual in a retail store by capturing an image of the individual and searching external or public reports and databases of high-risk individuals or groups, such as those shared among retailers or business associations in particular industries and/or geographic areas or available from government or law enforcement agencies.

References to "shrinkage" or "shrink," as used throughout this disclosure, are intended to refer generally to loss of inventory that can be attributed to factors such as theft, shoplifting, administrative errors, fraud, and cashier errors that benefit the purchaser.

Retail stores or environments in which these shrink mitigation systems and methods can be used include virtually any retail outlet, including a physical, brick-and-mortar storefront; or some other setting or location via which a customer may purchase or obtain products. Though only the case of a single retail environment is generally discussed in examples used herein, in many cases, the systems and methods can include a plurality of retail environments. For example, data from one or a plurality of retail environments can be aggregated, analyzed and applied to one or a plurality of other retail environments. In some embodiments, data from one or a plurality of retail environments can be aggregated, analyzed and/or applied in conjunction with data related to other shopping behaviors, patterns or other factors.

The retail environment can be associated with a retailer, such as by being a subsidiary, franchise, owned outlet, or other affiliate of the retailer. The retailer can be or have a home office or headquarters of a company, or some other affiliate, which often is located apart from the retail environment itself. In some embodiments, facilities or functions associated with the broader retailer can be partially or fully co-located with the retail environment. For example, the retailer and a brick-and-mortar retail environment can be co-located. At times in this application, the terms "store," "retailer," and "retail environment" are used interchangeably. These terms should generally be broadly construed in a non-limiting manner.

Figure 1:
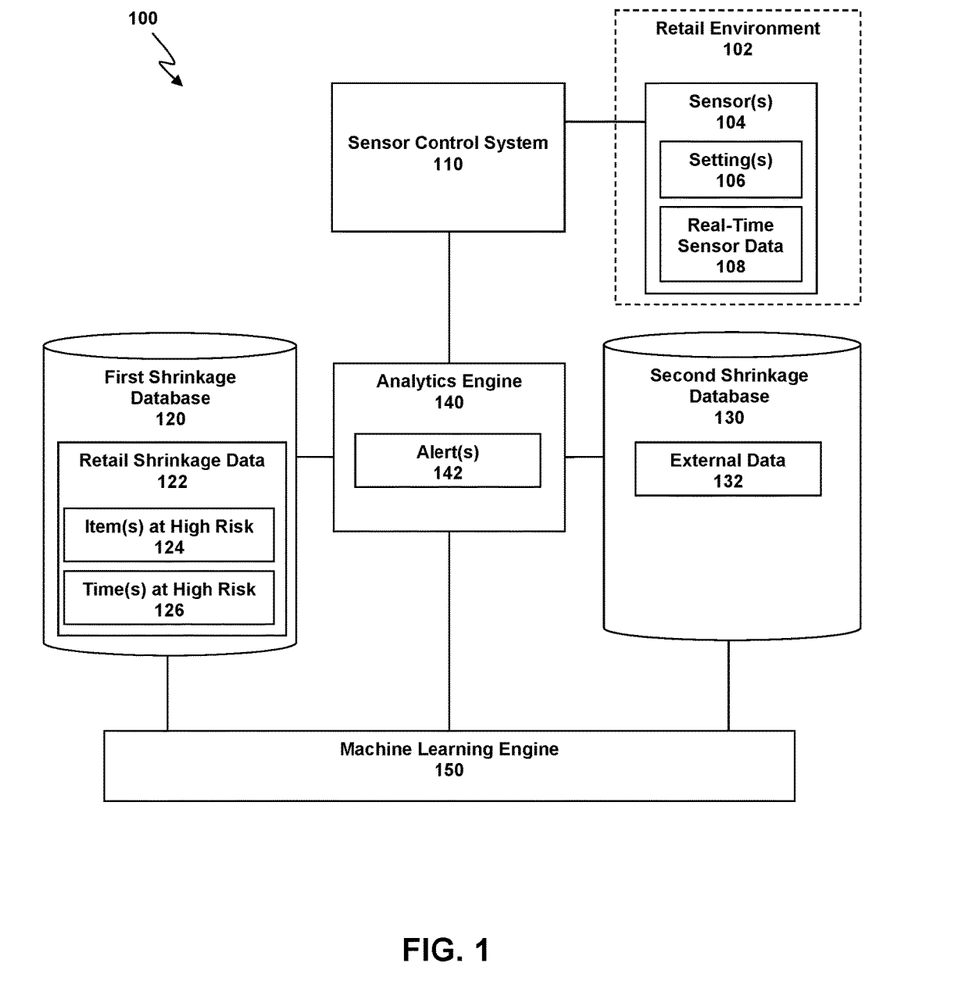
FIG. 1 is a block diagram of a retail shrinkage activity prediction and identification system according to an embodiment.

FIGS. 1-5 depict embodiments of a system or method for retail shrinkage activity prediction and identification. As shown in FIG. 1, retail shrinkage activity prediction and identification system 100 comprises a sensor control system 110, a first shrinkage database 120, a second shrinkage database 130, an analytics engine 140, and a machine learning engine 150.

Sensor control system 110 is communicatively coupled to sensors 104 located and arranged in a retail environment 102. In general, the sensor control system 110 is configured to control one or more settings 106 for each of the sensors 104. Further, the sensor control system 110 receives real-time sensor data 108 from the sensors 104 as well. Retail environment 102 can include any store or physical, defined retail space.

Sensors 104 can include a plurality of sensors. The plurality of sensors 104 can include any of a surveillance camera, an optical sensor, a motion detection sensor, a temperature sensor, an infrared sensor, a microphone, or a pressure sensor, for example. Settings 106 of each of the sensors 104 can include an activation, a direction, an angle, a zoom level, a location or a sensing area, for example. Real-time sensor data 108 can include image data, such as an image of clothing or facial features. Real-time sensor data 108 can also include data related to movements of individuals or groups, congregating of individuals, temperature profile data, infrared data, sound recording data, pressure data, time of purchase data, length of trip data, or other potentially relevant tracked information.

First shrinkage database 120 includes retail shrinkage data 122 for the retail environment 102. The retail shrinkage data 122 can include one or more items 124 at high risk for shrinkage. These may be items that have a history of being stolen frequently, are particularly valuable, or are known to be related to frequent shrinkage-related issues. Items that are small, easy to conceal, or difficult to track could also be deemed items 124 at high risk for shrinkage. The retail shrinkage data 122 can include one or more times 126 at high risk for shrinkage activity. These times 126 can include times of day when shrinkage is most common, times of the week common for shrinkage, times of the year common for shrinkage, or times of expected shrinkage related to holidays and local activities. Further, certain items can be correlated to certain times to identify high shrinkage risk. In some embodiments, at least one item 124 at high risk or at least one time 126 at high risk for shrinkage is part of the retail shrinkage data 122.

Second shrinkage database 130 contains external data 132 related to shrinkage in a geographic area of a retail environment 102. External data 132 can include publicly available data, criminal report data and/or public safety notice data, for example. External data 132 can additionally or alternatively include data or information shared among retailers or business associations in particular industries and/or geographic areas. Any outside public, private, or government database which provides information potentially relevant to shrinkage can be used. In some embodiments, external data 132 is provided, selected, filtered, and/or applied according to a geographic area of relevance to a particular retailer, store, operating area, or other characteristic.

Analytics engine 140 is communicatively coupled with first shrinkage database 120. Accordingly, analytics engine 140 can access retail shrinkage data 122, including information regarding items 124 at high risk for shrinkage and times 126 at high risk for shrinkage activity. Analytics engine 140 is also communicatively coupled with the second shrinkage database 130, and accordingly, has access to external data 132. Similarly, analytics engine 140 is also communicatively coupled with the sensor control system 110, such that analytics engine 140 can receive real-time sensor data 108 from sensors 104. Communications may be wired, wireless, and may rely on a variety of known techniques, protocols, or communication technology.

In general, analytics engine 140 compares or processes real-time sensor data 108 with external data 132 to identify high shrinkage risk situations. In some embodiments, comparing or processing the real-time sensor data 108 with the external data 132 to identify a high shrinkage risk situation comprises matching an image in the real-time sensor data 108 with an image in the external data 132. For example, an image of an individual may be compared to images in a police or local database of individuals having a history of shoplifting or related criminal offenses. In other embodiments, comparing the real-time sensor data 108 with the external data 132 comprises identifying and correlating sensor data events and/or patterns in sensor data 108 with data in or extracted from external data 132. This identifying and correlating, as well as the comparing or processing more generally, can include a single point or factor analysis (e.g., does sensor data element A match, correlate with and/or lead to external data element Z), multi-point/factor analysis (e.g., do sensor data elements A, B and C, respectively, match, correlate with, and/or lead to external data elements Z, Y and X; does the aggregate of sensor data elements A, B and C match, correlate with, and/or lead to the aggregate of external data elements Z, Y, and X; etc.), or a combination of single and multiple point/factor analysis.

When a high shrinkage risk situation is identified, an alert 142 is issued by the analytics engine 140, and the sensor control system alters one or more settings 106 of the sensors 104. Further, the retail shrinkage data 122 of the first shrinkage database 120 and/or the external data 132 of the second shrinkage database 130 are updated accordingly. In some embodiments, issuing an alert 142 by the analytics engine 140 includes notifying at least one of: asset protection personnel in the retail environment, asset protection personnel at a home office of a retailer, or a partner of the retailer. In certain embodiments, the partner of the retailer is another retail environment of the retailer, another retailer, a business association or organization, or an enforcement agency. Operation, actions and/or methods followed by the analytics engine 140 will subsequently be described in greater detail below related to FIG. 3.

Machine learning engine 150 is communicatively coupled with the first shrinkage database 120, the second shrinkage database 130, and the analytics engine 140. Machine learning engine 150 is able to receive and utilize retail shrinkage data 122, external data 132, and the issuance of an alert 142 to conduct predictive modeling. Predictive modeling can include identifying trends in any combination of the retail shrinkage data 122, the external data 132, the issuance of an alert 142, and the real-time sensor data 108 that relate to high shrinkage risk situations. In one example, a thousand items could be present at one location, where 30% of the items are deemed high risk, 20% of the items are deemed medium risk, and all the rest of the items are considered low risk. Based on historical data, the times and locations when shrink happened are known. Accordingly, it is possible to use a time series prediction or another machine learning algorithm to find any trends present. This enables prediction of when high risk situations will happen for those items which are high or medium risk. Further, the machine learning engine 150 can cause the analytics engine 140 to issue a further alert if the predictive modeling determines that a high shrinkage risk situation is likely to occur. In some embodiments, the analytics engine 140 is configured to cause the sensor control system 110 to alter the setting 106 of at least one of the plurality of sensors 104 if the predictive modeling determines that a high shrinkage risk situation is likely to occur.

Figure 2:
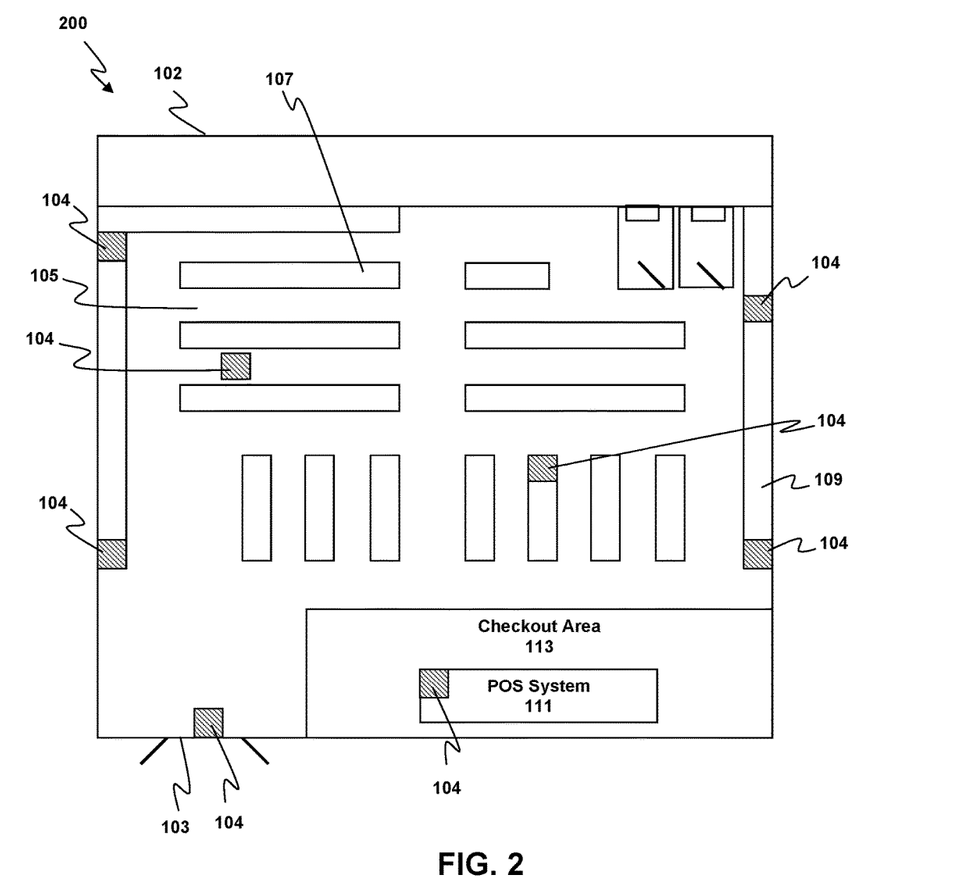
FIG. 2 is a schematic diagram of a retail environment equipped with sensors according to an embodiment.

Referring to FIG. 2, a retail environment 102 is depicted in which a plurality of sensors 104 is located in various locations throughout the retail environment 102. Sensors 104 may be located in fixed locations or may be mobile. In some embodiments, sensors 104 can solely or primarily include security cameras located throughout a store. Alternatively or additionally, sensors 104 can include infrared sensors, optical sensors, temperature sensors, pressure sensors, or other non-intrusive sensors. Sensors 104 may be mounted at or proximate to a store entrance or exit 103, in locations above or in various aisles 105 or shelves 107, on the walls 109, on the ceiling or fixtures, in the floor, on carts or baskets, or at any other suitable site of a retail environment 102. In some embodiments, a sensor 104 is mounted proximate to each lane of a point-of-sale (POS) system 111 or checkout area 113. In some cases, sensors 104 such as pressure or temperature sensors can be mounted or arranged in the floor or walking surfaces of retail environment 102. Sensors 104 that are mobile may be mounted on or in an unmanned aerial vehicle, drone, robot, ceiling structure or substructure, or floor structure permitting movement.

Sensors 104 are configured to obtain real-time sensor data 108 by sensing a characteristic of the environment, a product or structure (e.g., a shelf, modular, door, cart, basket, etc.), individuals, activities or movements of individuals or groups, timing or length of events, dates, times, or other potentially relevant data to shrink in a retail environment 102.

Figure 3:
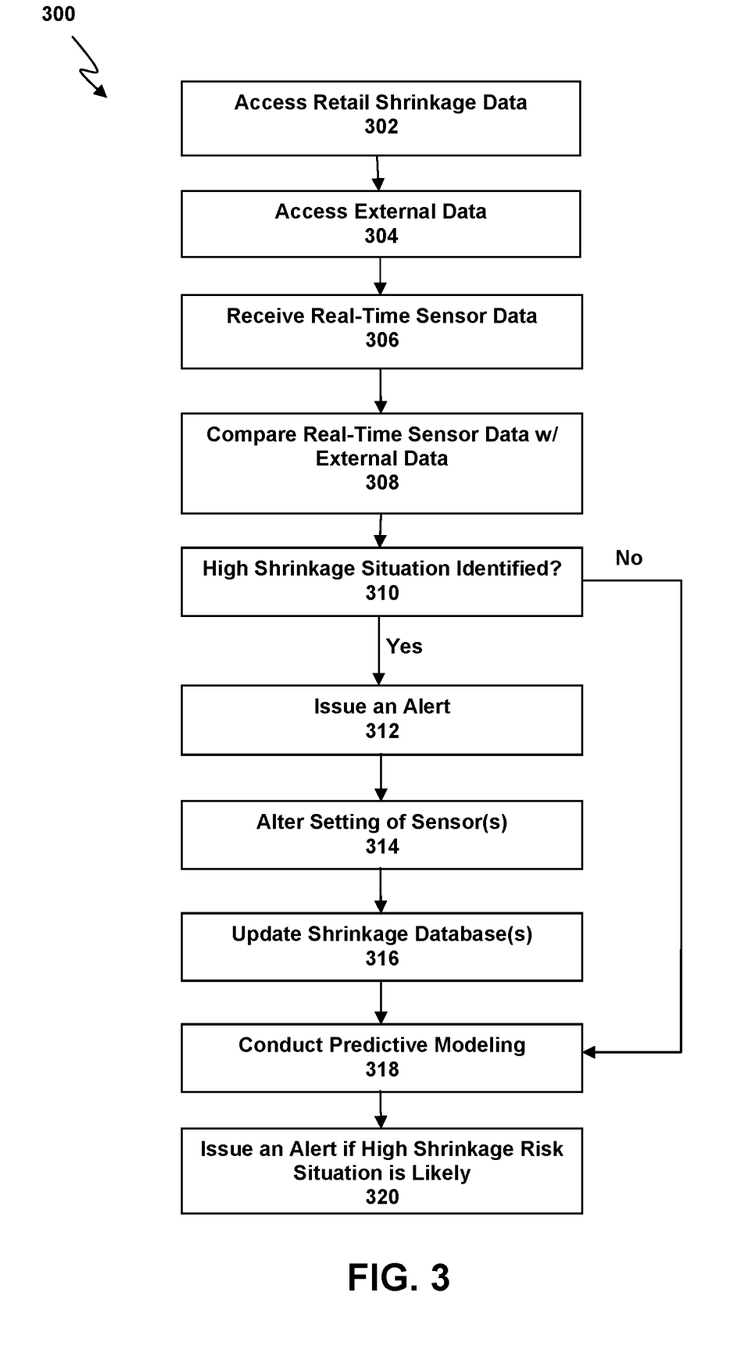
FIG. 3 is a flowchart of a method of predicting or identifying retail shrinkage activity according to an embodiment.

Referring to FIG. 3, a flowchart of a method 300 of predicting or identifying retail shrinkage activity is shown. In general, the method 300 includes first accessing retail shrinkage data including at least one item at high risk for shrinkage or at least one time at high risk for shrinkage activity in a retail environment 102, at 302. An item at high risk for shrinkage could be certain high-priced electronics or pharmaceuticals that frequently are stolen, for example. A time at high risk for shrinkage could be between 4-5 pm in some locations, for example.

Next at 304, the method includes accessing external data 132 related to shrinkage in a geographic area of the retail environment 102. In some embodiments, accessing external data 132 can include accessing at least one of criminal report data or public safety notice data. At 306, real-time sensor data 108 is received from a plurality of sensors 104 arranged in the retail environment 102. The plurality of sensors 104 can include surveillance cameras, optical sensors, motion detection sensors, temperature sensors, infrared sensors, microphones, or pressure sensors, for example.

At 308, the real-time sensor data 108 is compared with the external data 132 to identify a high shrinkage risk situation. In certain embodiments, comparing the real-time sensor data 108 with the external data 132 to identify a high shrinkage risk situation includes matching an image in the real-time sensor data 108 with an image in the external data 132.

At 310, identification of the existence of a high shrinkage situation is questioned. If a high shrinkage risk situation is identified, an alert 142 is issued at 312. This can include notifying at least one of asset protection personnel in the retail environment 102, asset protection personnel at a home office of a retailer, or a partner of the retailer. In some cases, the partner of the retailer is another retail environment of the retailer, another retailer, or an enforcement agency. Alternatively, if no high shrinkage risk situation is identified, action will proceed to the predictive modeling step 318, as described below.

Issuance of an alert at 312, however, causes a sensor control system 110 to alter a setting 106 of at least one of the plurality of sensors 104, as indicated at 314. Such a setting 106 can include at least one of an activation, a direction, a location or a sensing area. Next, at least one of the retail shrinkage data 122 or the external data 132 is updated at 316.

At 318, predictive modeling is conducted using the retail shrinkage data 122, the external data 132, and the issuance of an alert 142. Conducting predictive modeling can include identifying trends in any combination of the retail shrinkage data 122, the external data 132, the issuance of an alert 142, and the real-time sensor data 108 that relate to high shrinkage risk situations. At 320, an alert is issued if the predictive modeling determines that a high shrinkage risk situation is likely to occur. In some cases, if the predictive modeling determines that a high shrinkage risk situation is likely to occur, the sensor control system 110 can be caused to alter a setting 106 of at least one of the plurality of sensors 104.

Figure 4:
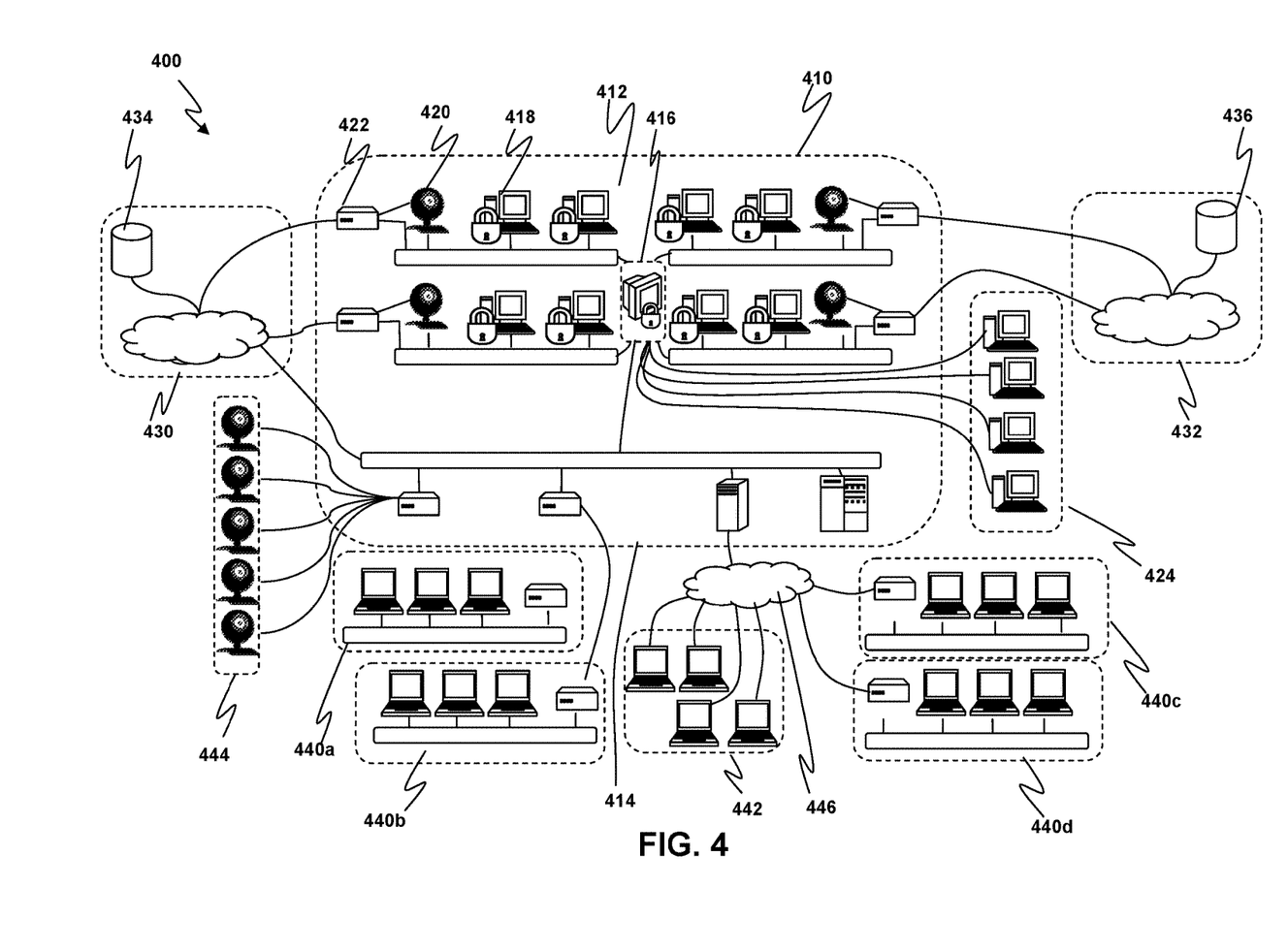
FIG. 4 is a diagram of a store network in which a retail shrinkage activity prediction and identification system can be implemented according to an embodiment.

FIG. 4 shows a diagram of an example of a store network 400 in which a retail shrinkage activity prediction and identification system can be implemented. In FIG. 4, the store network generally includes a store 410 having a main retail environment 412 and a back office 414. The main retail environment 412 includes a rotating system 416 having a plurality of related POS systems 418, cameras 420, and connectivity devices 422. Also connected to the main retail environment are maintenance resources 424. In general, connectivity devices 422 communicatively couple the components of the front office 412 with one or more offsite data locations 430 and 432. Offsite data locations may represent cloud computing in some embodiments and do not necessarily represent hardware at a single location. Offsite data locations 430 and 432 provide databases 434 and 436, in this example. Maintenance resources 424 can be communicatively coupled to an offsite data location 432 as well.

The back office 414 of the store 410 contains servers, processing resources, and connectivity devices 422. The back office 414 is connected to a plurality of user groups 440a-d, contactors 442 and related cameras 444 via the connectivity devices 422 or the Internet 446. In general, cameras 420 can represent sensors 104 and a sensor control system 110 can be present in one location or spread out over a plurality of devices shown in the store network 400 in the embodiment shown. First and second shrinkage databases 120 and 130 can be located at locations such as databases 434 and 436, or in one or more other devices shown in the store network 400. Likewise, an analytics engine 140 and a machine learning engine 150 can be present in and represented by one or more other devices shown in the store network 400 of FIG. 4.

Figure 5:
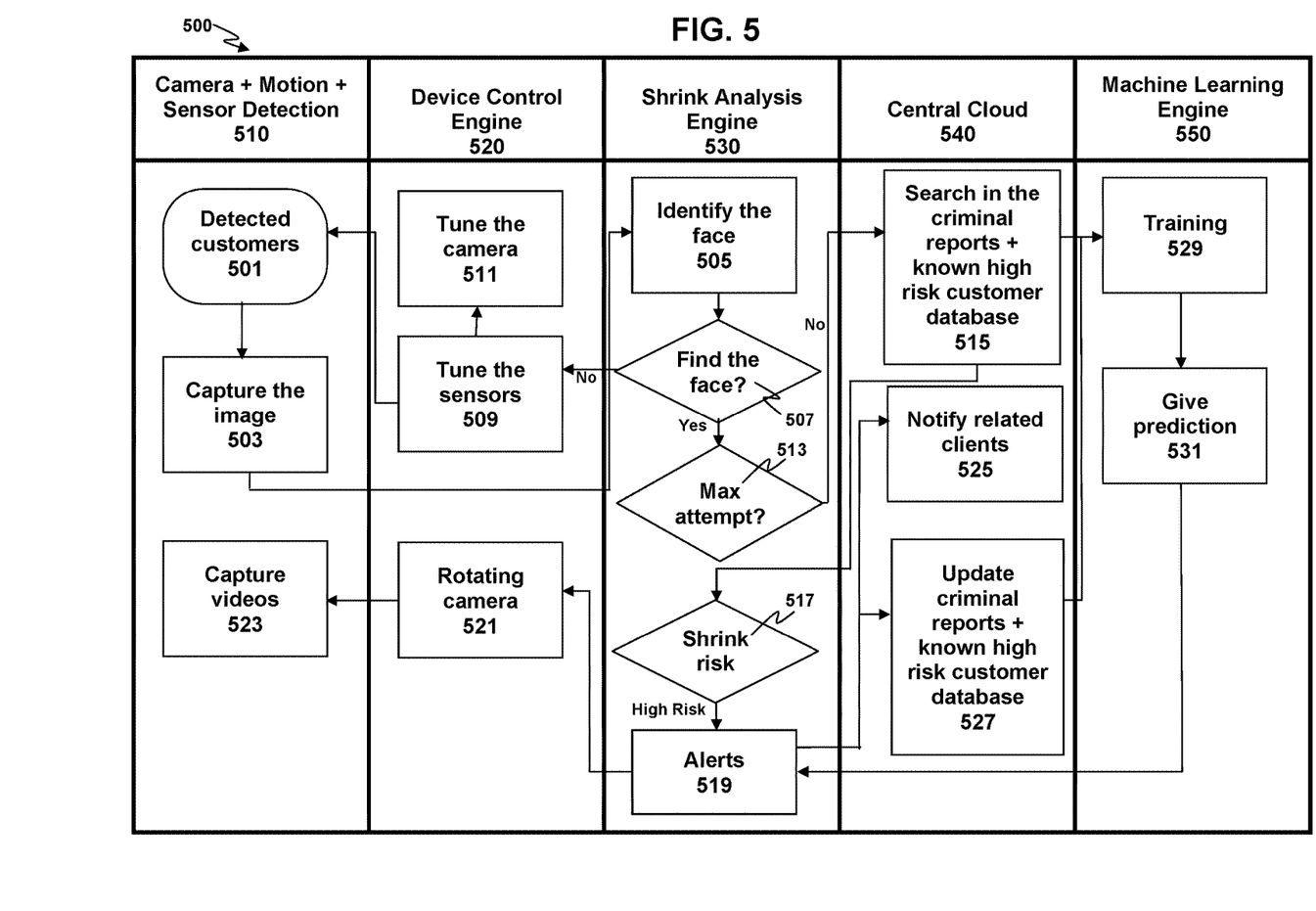
FIG. 5 is a flowchart of a method of predicting or identifying retail shrinkage activity according to an embodiment.

Referring to FIG. 5, a flowchart of an example of a method 500 of predicting or identifying retail shrinkage is shown. In general, the flowchart of the method 500 is divided into columns corresponding to various parts of the system in which actions occur. In general, these include: camera and motion and sensor detection 510; device control engine 520; shrink analysis engine 530; central cloud 540; and machine learning engine 550. In certain embodiments, the camera and motion and sensor detection 510 can correspond to the sensors 104 described earlier in this disclosure. Likewise, device control engine 520 can be understood to generally correspond to server control system 110, shrink analysis engine 530 and central cloud 540 can together generally correspond to the analytics engine 140, and machine learning engine 550 corresponds to machine learning engine 150.

Initially at 501, an individual is detected and an image is captured at 503. Next, a procedure is used to identify one or more features of the individual at 505 using the analytics engine. The system is queried as to whether a match for the feature(s) was found at 507. If no match is found at 507, the device control engine tunes the sensors at 509 and tunes the camera at 511. If a match for the feature(s) is found at 507, and a maximum number of attempts for searching the matched feature(s) is not exceeded at 513, the central cloud 540 searches criminal reports and one or more known high risk individual databases at 515. The shrink risk is assessed at 517, and if a high risk of shrink is found, alerts 519 are given. Further, cameras are rotated appropriately to the individual detected at 521 and video is captured of the individual and his or her movements at 523. Further if alerts are given at 519, clients are notified at 525 and criminal reports and known high risk individual databases are updated at 527. This information is fed into the machine learning engine 550 for training at 529 and predictions are made by the machine learning engine 550 at 531.

In embodiments, system 100 and/or its components or systems can include computing devices, microprocessors, modules and other computer or computing devices, which can be any programmable device that accepts digital data as input, is configured to process the input according to instructions or algorithms, and provides results as outputs. In an embodiment, computing and other such devices discussed herein can be, comprise, contain or be coupled to a central processing unit (CPU) configured to carry out the instructions of a computer program. Computing and other such devices discussed herein are therefore configured to perform basic arithmetical, logical, and input/output operations.

Computing and other devices discussed herein can include memory. Memory can comprise volatile or non-volatile memory as required by the coupled computing device or processor to not only provide space to execute the instructions or algorithms, but to provide the space to store the instructions themselves. In embodiments, volatile memory can include random access memory (RAM), dynamic random access memory (DRAM), or static random access memory (SRAM), for example. In embodiments, non-volatile memory can include read-only memory, flash memory, ferroelectric RAM, hard disk, floppy disk, magnetic tape, or optical disc storage, for example. The foregoing lists in no way limit the type of memory that can be used, as these embodiments are given only by way of example and are not intended to limit the scope of the invention.

In embodiments, the system or components thereof can comprise or include various modules or engines, each of which is constructed, programmed, configured, or otherwise adapted, to autonomously carry out a function or set of functions. The term "engine" as used herein is defined as a real-world device, component, or arrangement of components implemented using hardware, such as by an application-specific integrated circuit (ASIC) or field-programmable gate array (FPGA), for example, or as a combination of hardware and software, such as by a microprocessor system and a set of program instructions that adapt the engine to implement the particular functionality, which (while being executed) transform the microprocessor system into a special-purpose device. An engine can also be implemented as a combination of the two, with certain functions facilitated by hardware alone, and other functions facilitated by a combination of hardware and software. In certain implementations, at least a portion, and in some cases, all, of an engine can be executed on the processor(s) of one or more computing platforms that are made up of hardware (e.g., one or more processors, data storage devices such as memory or drive storage, input/output facilities such as network interface devices, video devices, keyboard, mouse or touchscreen devices, etc.) that execute an operating system, system programs, and application programs, while also implementing the engine using multitasking, multithreading, distributed (e.g., cluster, peer-peer, cloud, etc.) processing where appropriate, or other such techniques. Accordingly, each engine can be realized in a variety of physically realizable configurations, and should generally not be limited to any particular implementation exemplified herein, unless such limitations are expressly called out. In addition, an engine can itself be composed of more than one sub-engines, each of which can be regarded as an engine in its own right. Moreover, in the embodiments described herein, each of the various engines corresponds to a defined autonomous functionality; however, it should be understood that in other contemplated embodiments, each functionality can be distributed to more than one engine. Likewise, in other contemplated embodiments, multiple defined functionalities may be implemented by a single engine that performs those multiple functions, possibly alongside other functions, or distributed differently among a set of engines than specifically illustrated in the examples herein.

In an exemplary embodiment, one or more of the embodiments include one or more localized Internet of Things (IoT) devices and controllers. As a result, in an embodiment, the localized IoT devices and controllers can perform most, if not all, of the computational load and associated monitoring and then later asynchronous uploading of summary data can be performed by a designated one of the IoT devices to a remote server. In this manner, the computational effort of the overall system may be reduced significantly. For example, whenever a localized monitoring device allows remote transmission, secondary utilization of controllers secures data for other IoT devices and permits periodic asynchronous uploading of the summary data to the remote server. In addition, in an exemplary embodiment, the periodic asynchronous uploading of summary data may include a key kernel index summary of the data as created under nominal conditions. In an embodiment, the kernel encodes relatively recently acquired intermittent data ("KRI"). As a result, in an embodiment, KRI includes a source of substantially all continuously-utilized near term data. However, KRI may be discarded depending upon the degree to which such KRI has any value based on local processing and evaluation of such KRI. In an exemplary embodiment, KRI may not even be utilized in any form if it is determined that KRI is transient and may be considered as signal noise.

Furthermore, in an embodiment, the kernel can reject generic data ("KRG") by filtering incoming raw data using a stochastic filter that provides a predictive model of one or more future states of the system and can thereby filter out data that is not consistent with the modeled future states which may, for example, reflect generic background data. In an exemplary embodiment, KRG incrementally sequences all future undefined cached kernels of data in order to filter out data that may reflect generic background data. In an embodiment, KRG incrementally sequences all future undefined cached kernels having encoded asynchronous data in order to filter out data that may reflect generic background data. In a further exemplary embodiment, the kernel can filter out noisy data ("KRN"). In an exemplary embodiment, KRN, like KRI, includes substantially a continuously utilized near term source of data, but KRN may be retained in order to provide a predictive model of noisy data.

Various embodiments of systems, devices, and methods have been described herein. These embodiments are given only by way of example and are not intended to limit the scope of the invention. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the invention.

Persons of ordinary skill in the relevant arts will recognize that the subject matter hereof may comprise fewer features than illustrated in any of the individual embodiments described above. The embodiments described herein are not meant to be an exhaustive presentation of the ways in which the various features of the subject matter herein may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

The invention claimed is:

1. A retail shrinkage activity prediction and identification system comprising: a sensor control system communicatively coupled with a plurality of sensors arranged in a retail environment, the sensor control system configured to control a setting of each of the plurality of sensors; a first shrinkage database comprising retail shrinkage data for at least the retail environment, the retail shrinkage data comprising at least one item at high risk for shrinkage or at least one time at high risk for shrinkage activity; a second shrinkage database comprising external data related to shrinkage in a geographic area of the retail environment; an analytics engine communicatively coupled with the first shrinkage database to access the retail shrinkage data, the second shrinkage database to access the external data, and the sensor control system to receive real-time sensor data from the plurality of sensors, the analytics engine configured to: compare the real-time sensor data with the external data to identify a high shrinkage risk situation, and if a high shrinkage risk situation is identified, issue an alert, cause the sensor control system to alter a setting of at least one of the plurality of sensors, and update at least one of the first shrinkage database or the second shrinkage database; and a machine learning engine communicatively coupled with the first shrinkage database, the second shrinkage database, and the analytics engine to use the retail shrinkage data, the external data, and the issuance of an alert to conduct predictive modeling and cause the analytics engine to issue an alert if the predictive modeling determines that a high shrinkage risk situation is likely to occur.

2. The system of claim 1, wherein the setting of each of the plurality of sensors comprises at least one of an activation, a direction, a location or a sensing area.

3. The system of claim 1, wherein the plurality of sensors comprise any of an optical sensor, a motion detection sensor, a temperature sensor, an infrared sensor, a microphone, or a pressure sensor.

4. The system of claim 1, wherein the external data comprises at least one of criminal report data or public safety notice data.

5. The system of claim 1, wherein comparing the real-time sensor data with the external data to identify a high shrinkage risk situation comprises matching an image in the real-time sensor data with an image in the external data.

6. The system of claim 1, wherein issuing an alert by the analytics engine comprises notifying at least one of asset protection personnel in the retail environment, asset protection personnel at a home office of a retailer, or a partner of the retailer.

7. The system of claim 6, wherein the partner of the retailer is another retail environment of the retailer, another retailer, or an enforcement agency.

8. The system of claim 1, wherein the predictive modeling comprises identifying trends in any combination of the retail shrinkage data, the external data, the issuance of an alert, and the real-time sensor data that relate to high shrinkage risk situations.

9. The system of claim 1, wherein the analytics engine is configured to cause the sensor control system to alter the setting of at least one of the plurality of sensors if the predictive modeling determines that a high shrinkage risk situation is likely to occur.

10. A method of predicting or identifying retail shrinkage activity comprising:
  accessing retail shrinkage data comprising at least one item at high risk for shrinkage or at least one time at high risk for shrinkage activity in a retail environment;
  accessing external data related to shrinkage in a geographic area of the retail environment;
  receiving real-time sensor data from a plurality of sensors arranged in the retail environment;
  comparing the real-time sensor data with the external data to identify a high shrinkage risk situation;
  if a high shrinkage risk situation is identified:
    issuing an alert,
    causing a sensor control system to alter a setting of at least one of the plurality of sensors, and
    updating at least one of the retail shrinkage data or the external data;
  conducting predictive modeling using the retail shrinkage data, the external data, and the issuance of an alert; and
  issuing an alert if the predictive modeling determines that a high shrinkage risk situation is likely to occur.

11. The method of claim 10, wherein the setting of at least one of the plurality of sensors comprises at least one of an activation, a direction, a location or a sensing area.

12. The method of claim 10, wherein the plurality of sensors comprise any of an optical sensor, a motion detection sensor, a temperature sensor, an infrared sensor, a microphone, or a pressure sensor.

13. The method of claim 10, wherein accessing external data comprises accessing at least one of criminal report data or public safety notice data.

14. The method of claim 10, wherein comparing the real-time sensor data with the external data to identify a high shrinkage risk situation comprises matching an image in the real-time sensor data with an image in the external data.

15. The method of claim 10, wherein issuing an alert if a high shrinkage risk situation is identified comprises notifying at least one of asset protection personnel in the retail environment, asset protection personnel at a home office of a retailer, or a partner of the retailer.

16. The method of claim 15, wherein the partner of the retailer is another retail environment of the retailer, another retailer, or an enforcement agency.

17. The method of claim 10, wherein conducting predictive modeling comprises identifying trends in any combination of the retail shrinkage data, the external data, the issuance of an alert, and the real-time sensor data that relate to high shrinkage risk situations.

18. The method of claim 10, further comprising causing a sensor control system to alter a setting of at least one of the plurality of sensors if the predictive modeling determines that a high shrinkage risk situation is likely to occur.

* * * * *